(12) United States Patent
Tao

(10) Patent No.: US 9,426,849 B2
(45) Date of Patent: Aug. 23, 2016

(54) CONNECTION CIRCUIT FOR CONNECTING A DRIVER TO AN EXTERNAL POWER SUPPLY FOR DRIVING AN LED UNIT

(71) Applicant: KONINKLIJKE PHILIPS N.V., Eindhoven (NL)

(72) Inventor: Haimin Tao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/902,655

(22) PCT Filed: Jul. 4, 2014

(86) PCT No.: PCT/EP2014/064279
§ 371 (c)(1),
(2) Date: Jan. 4, 2016

(87) PCT Pub. No.: WO2015/001067
PCT Pub. Date: Jan. 8, 2015

(65) Prior Publication Data
US 2016/0174307 A1    Jun. 16, 2016

(30) Foreign Application Priority Data

Jul. 5, 2013  (EP) ..................................... 13175246

(51) Int. Cl.
*H05B 33/08* (2006.01)
*H05B 41/04* (2006.01)
*H05B 41/34* (2006.01)

(52) U.S. Cl.
CPC ........ *H05B 33/0809* (2013.01); *H05B 33/0803* (2013.01); *H05B 41/042* (2013.01); *H05B 41/34* (2013.01)

(58) Field of Classification Search
USPC ..................... 315/129, 135, 171, 200 R, 203, 315/205–207, 185 S, 224, 247, 209 R, 291, 315/307–326
See application file for complete search history.

(56) References Cited

U.S. PATENT DOCUMENTS 3,974,397 A    8/1976  Killough, Jr.
6,208,085 B1 *  3/2001  Lehnert ................. H02M 1/425
                                                           315/209 R (Continued)

FOREIGN PATENT DOCUMENTS

| DE | 202011003952 | 5/2012 |
|---|---|---|
| WO | 2009/136322 | 11/2009 |
| WO | 2013/024389 | 2/2013 |

*Primary Examiner* — Tuyet Vo

(57) ABSTRACT

The present invention relates to a connection circuit (10) for connecting a driver device (26) to an external power supply (16, 21) for driving a load (28), in particular an LED unit (28) comprising one or more LEDs, comprising: a pair of first input terminals (12, 14) for connecting the connection circuit (10) to an external power supply (16, 21) and for receiving an input voltage (V10, V20) from the external power supply (16, 21), at least one second input terminal (18, 20) for connecting the connection circuit (10) to the external power supply (21) and for receiving an input voltage (V20) from the external power supply (21), a rectifier unit (22) connected to the pair of first input terminals (12, 14) and to the at least one second input terminal (18, 20) for rectifying the input voltage (V10, V20) received from the first input terminals (16, 21) and/or the at least one second input terminal (18, 20) and for providing a rectified voltage (V30) to the driver device (26) for driving the load (28), wherein the at least one second input terminal (18, 20) is connected via a frequency filter (50) to the rectifier unit (22).

14 Claims, 5 Drawing Sheets

(56) References Cited

U.S. PATENT DOCUMENTS

| | | | |
|---|---|---|---|
| 6,417,631 B1* | 7/2002 | Chen | H02M 5/458 315/200 R |
| 2010/0134031 A1 | 6/2010 | Shuy et al. | |
| 2010/0201270 A1 | 8/2010 | Kuo | |
| 2011/0057572 A1 | 3/2011 | Kit et al. | |
| 2011/0121751 A1 | 5/2011 | Harrison | |
| 2012/0299494 A1 | 11/2012 | Hartikka | |
| 2016/0102813 A1* | 4/2016 | Ye | F21K 9/17 315/205 |

* cited by examiner

CONNECTION CIRCUIT FOR CONNECTING A DRIVER TO AN EXTERNAL POWER SUPPLY FOR DRIVING AN LED UNIT

CROSS REFERENCE TO RELATED APPLICATIONS

This application is the U.S. National Phase application under 35 U.S.C. §371 of International Application No. PCT/EP2014/064279, filed Jul. 4, 2014, published as WO 2015/001067 on Jan. 8, 2015, which claims the benefit of European Patent Application Number 13175246.1 filed Jul. 5, 2013. These applications are hereby incorporated by reference herein.

FIELD OF THE INVENTION

The present invention relates to a connection circuit for connecting a driver device to an external power supply for driving a load, in particular an LED unit comprising one or more LEDs. Further, the present invention relates to a light apparatus.

BACKGROUND OF THE INVENTION

In the field of lighting devices, in particular LED units for offline applications such as retrofit lamps, solutions are demanded to cope with high efficiency, high power density, long lifetime, high power factor, low costs and different supply voltages among other relevant features. Various LEDs tubes (TLED) are used to replace fluorescent (TL) lamps as a retrofit lamp. Most of the TL (T8) lamps are driven by high frequency ballasts, wherein either instant start or programmed start ballasts are used. The program start ballasts preheat the filament before ignite the lamp in order to enlarge the lifetime while the instant start ballasts does not provide filament heating. Therefore, retrofit LED lamps have to be adapted to different drive voltages.

In order to operate the retrofit LED lamp properly, most of the retrofit LED lamps require a rewiring of the fluorescent lamp, i.e. by bypassing the ballast. This is complicated and requires a fixture of the present driver circuit. The most desirable way is to replace the fluorescent lamp directly by the LED tube without changing anything and by connecting the input terminals of the LED lamp with the high frequency ballast output terminals. However, this direct replacement leads to large power loss in the ballast and reduces the efficiency of the lamp.

A further demand of TLED retrofit lamps is to prevent electrical shocks when the TLED lamp is fixed. To avoid electrical shocks due to an electrical contact of the input terminals to external connection terminals, it is widely used to disconnect the connection terminals at one end of the TLED so that no electrical conductive path is provided from one end to the other. However, this pin safety solution requires a rewiring of the fluorescent lamp fixture including the above-mentioned disadvantages.

From WO 2013/024389 A1 an electronic ballast-compatible lighting driver for light emitting diode lamps is known having a rectifier for connecting the driver to the ballast and for providing a rectified voltage for driving the LED unit. However, since the driver device is only connectable to an existing ballast, the power loss of the ballast reduces the efficiency of the lighting unit in general.

From US 2010/0201270 A1 a diode light tube and an AC switching power supply is known having two separate input connections to connect different AC power supplies to the diode, wherein the connection terminals for the different power supplies are connected to separate rectifier units in order to provide a DC voltage for powering the load. The disadvantage of the driver device known from this document is that the technical effort due to the separate rectifier units is increased and that an electrical connection is provided between the different input terminals so that the risk of electrical shocks is present and a separate pin safety is necessary.

WO2009/136322 discloses a connection circuit for connecting a driver device of a LED unit to a power supply, which circuit is provided with first and second input terminals and a rectifier unit. Both the first and the second input terminal are directly connected to the rectifier. The connection of the first terminal with the rectifier unit on the one hand and the connection of the second terminal with the rectifier on the other hand are bridged by a capacitor. This connection circuit is suitable for use in fixture with ballast however is not suitable for connection with other power supplies. Moreover, safety is not guaranteed when the connection circuit is connected in an unsuitable fixture or when improper used.

SUMMARY OF THE INVENTION

It is therefore an object of the present invention to provide an improved connector device and an improved lighting apparatus which can be connected to different power supplies with low technical effort and high efficiency.

According to one aspect of the present invention, a connection circuit is provided for connecting a driver device to an external power supply for driving a load, in particular an LED unit comprising one or more LEDs, comprising:

a pair of first input terminals for connecting the connection circuit to an external power supply and for receiving an input voltage from the external power supply, at least one second input terminal suitable for connecting the connection circuit to the external power supply and for receiving an input voltage from the external power supply, a rectifier unit connected to the pair of first input terminals and to the at least one second input terminal for rectifying the input voltage received from the first input terminals and/or the at least one second input terminal and for providing a rectified voltage to the driver device for driving the load, wherein the at least one second input terminal is connected to the rectifier unit only by means of a conductive path including a frequency filter.

According to another aspect of the present invention, a light apparatus is provided comprising a plurality of lighting elements, in particular a plurality of LEDs, a driver device for driving the lighting elements and a connection circuit according to the present invention for connecting the driver device to an external power supply.

The present invention is based on the idea to provide a connection circuit for connecting the driver device to different electrical power supplies which provide different supply voltages having different frequencies. The different power supplies can be connected to the first input terminals and to the second input terminal, wherein the rectifier unit rectifies a first input voltage and a second input voltage alternatively depending on which kind of electrical power supply is connected to the input terminals. Since all input terminals are connected to one rectifier unit, the electrical power supply can be either connected to the first input terminal or to the first and the second input terminals. Further, since the second input terminal is connected via a frequency filter to the rectifier unit, the second input terminal is protected from low frequency input voltages such as mains voltage, while a high frequency e.g. from a high frequency ballast can be provided from the second input terminal to the rectifier unit. Consequently, the connection circuit is compatible with mains voltage and HF ballast voltage so that the load can be connected with high flexibility to different electrical power supplies as a retrofit component.

In a preferred embodiment, the rectifier unit comprises three parallel rectifier paths, wherein the first input terminals are each connected to a first and a second of the rectifier paths and the at least one second input terminal is connected to a third of the rectifier path. Since the rectifier unit comprises the three different rectifier paths, the external power supply can be connected flexible to the first input terminal or to one of the first input terminals and the second input terminal and the input voltage can be rectified without rewiring.

In a further preferred embodiment, each of the rectifier paths comprises two diodes, wherein the input terminals are each connected to one node between the two diodes. This is a simple solution to provide a universal rectifier unit for rectifying different alternating voltages connected to two of the input terminals.

In a further preferred embodiment, the frequency filter is a high pass filter for filtering low frequency input voltages. This is a simple possibility to provide a low impedance path for an operating frequency of a high frequency ballast and a large impedance for mains frequency so that a high frequency can be provided to the rectifier unit and the low mains frequency can be blocked for pin safety.

In a preferred embodiment, the first input terminals are connected to each other via a high pass filter. This is a possibility to reduce the influence of electromagnetic discharges and current peaks for the case that the first input terminals are connected to mains wherein the high pass filter provides a low impedance between the pair of first input terminals for a high frequency voltage so that the high frequency voltage of a high frequency ballast is provided to both first input terminals.

In a preferred embodiment, the frequency filter is connected to a pair of second input terminals for receiving the input voltage. This is a possibility to connect different high frequency connectors to the connection circuit in order to connect the connection circuit to instant start high frequency ballasts.

In a preferred embodiment, the pair of second input terminals are connected via an input circuitry to the frequency filter, wherein the input circuitry comprises a plurality of resistors. By means of the resistors, the filament resistance of the lamp to be replaced by the connection circuit can be emulated.

In a preferred embodiment, the pair of first input terminals is connected via an input circuitry to the rectifier unit, wherein the input circuitry comprises a plurality of resistors. This is a possibility to emulate the filament resistance of a lamp to be replaced by the connection circuit with low technical effort.

In a further preferred embodiment, the rectifier unit is connected via an electromagnetic interference filter device to the driver device. This is a simple possibility to protect the driver device from electromagnetic interference from the external power source and to reduce emission of electromagnetic interference from the driver device to the external power source and radiation of electromagnetic field to the space.

In a preferred embodiment, the electromagnetic interference filter device comprises an inductance and a capacitor.

In a further preferred embodiment, the driver device comprises a DC to DC converter for providing a drive current for driving a load. This is a possibility to set the rectified voltage received from the rectifier unit to a required DC voltage level and to provide a drive current for driving the load.

In a preferred embodiment, the frequency filter comprises two capacitors connected in series between the at least one second input terminal and the rectifier unit. This is a possibility to increase the pin safety due to the redundant capacitor.

In a further preferred embodiment, the pair of first input terminals are adapted to be connected to mains voltage supply. This is a possibility to contact the connection circuitry directly to mains.

In a preferred embodiment, the pair of first input terminals and the at least one second input terminal are adapted to be connected to a high frequency ballast circuitry. This is the possibility to connect the connection circuit to high frequency ballasts so that a rewiring for retrofit can be omitted.

As mentioned above, the present invention provides a connection circuit for flexible connecting the driver device to different power supplies, wherein additional rewiring can be omitted. To avoid rewiring, the first input terminals and the second input terminal are connected to a single rectifier unit by means of which the different alternating input voltages applied to two of the input terminals can be rectified. Since the second input terminal is connected via the frequency filter to the rectifier unit, the second input terminal is disconnected from mains voltage and the connection circuit is protected from misconnection of the input terminals. Hence, a flexible retrofit connector can be provided.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
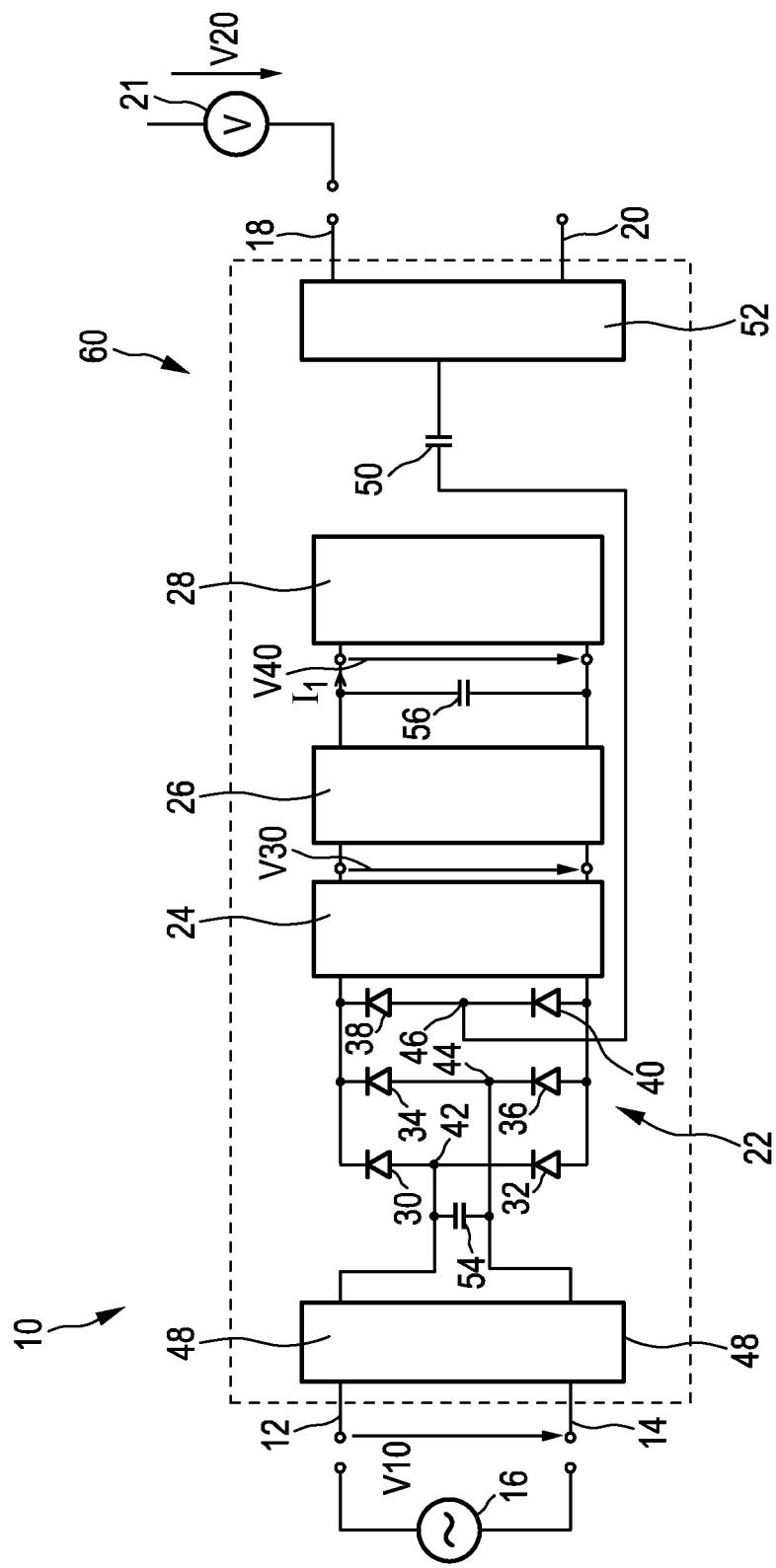
FIG. 1 shows a schematic block diagram of an electric apparatus and a connection circuitry for connecting the apparatus to different electrical power supplies.

FIG. 1 shows a schematic block diagram of a connection circuit generally denoted by 10. The connection circuit 10 comprises a pair of first input terminals 12, 14 for connecting the connection circuit 10 to an external power supply 16. The power supply 16 is preferably mains providing mains voltage V10 as a first input voltage. The connection circuit 10 further comprises a pair of second input terminals 18, 20 for connecting the connection circuit to a second external power supply 21 providing a second input voltage V20 as further described below. The first input terminals 12, 14 and the second input terminals 18, 20 are connected to a rectifier unit 22 for rectifying the alternating input voltages V10, V20 received from the first input terminals 12, 14 and from the second input terminals 18, 20. The rectifier unit 22 is connected via an electromagnetic interference filter device 24 to a driver stage 26. The driver stage 26 receives from the rectifier unit 22 a rectified voltage V30 and provides an output voltage V40 and a drive current $I_1$ to a load 28 for driving the load 28.

The rectifier unit 22 is a complex rectifier comprising three parallel rectifying paths, wherein the first input terminals 12, 14 are each connected to a first and a second of the rectifying paths and wherein the second input terminals 18, 20 are connected to a third of the rectifying path. The rectifying paths each comprise two diodes 30, 32, 34, 36, 38, 40. The diodes 30-40 are fast diodes for rectifying mains voltage V10 or high frequency voltages V20 received from the second external power supply 21. The input terminals are respectively connected to a node 42, 44, 46 between two of the diodes 30-40 of the respective rectifying paths so that two of the rectifying paths each form a rectifier depending on which of the input terminals 12, 14, 18, 20 are connected to an external power supply 16, 21.

The first input terminals 12, 14 are connected via an input circuitry 48 to the rectifier unit 22, wherein the input circuitry 48 includes power resistors having a resistance value similar to a filament resistance of the lamp to be replaced by the load 28. The second input terminals 18, 20 are connected to each other and connected via a filter capacitor 50 to the node 46 of the respective rectifying path of the rectifier unit 22. The filter capacitor 50 has a capacity of 0.5 n-10 nF and serves as a high pass filter. The filter capacitor 50 has a low impedance for high frequency voltages typically >25 kHz provided by the second external power supply 21 so that high frequency current can pass through the filter capacitor 50 from the second input terminals 18, 20 to the rectifier unit 22. The filter capacitor 50 has a large impedance at mains frequency (50/60 Hz) such that the mains voltage V10 cannot pass through the filter capacitor 50 to the second input terminals 18, 20. Hence, the second input terminals 18, 20 are disconnected from mains voltage 10 by means of the filter capacitor 50 so that the leakage current from mains and the risk of electrical shocks at the second input terminals is reduced.

The second input terminals 18, 20 are connected via an input circuitry 52 to the filter capacitor 50, wherein the input circuitry 52 comprises power resistors having a resistance value similar to a filament resistance of a lamp which shall be replaced by the load 28.

The first input terminals 12, 14 are connected to each other via an input capacitor 54. The input capacitor 54 acts as a high pass filter and comprises preferably a capacitance >10 nF. The input capacitor 54 provides a low impedance path between the first input terminal 12, 14 for high frequencies of the second input voltage V20 and a high impedance for mains voltage frequency. If the first input terminals 12, 14 are connected to mains 16, the mains voltage V10 is supplied to the rectifier unit 22 and respectively transformed to the rectified voltage V30. If a high frequency voltage is connected to one of the first input terminals 12, 14, the input capacity 54 serves as a connection between the first input terminals 12, 14 so that a similar voltage potential is provided to the rectifier unit 22 via the input terminals 12, 14 and a low impedance path between the two input terminals 12, 14 is provided to the programmed start ballast (which is necessary for proper function of some types of programmed start ballasts), wherein a high frequency voltage potential is provided via the filter capacitor 50 to the node 46 so that a high frequency input voltage is rectified to the rectified voltage V30.

The driver stage 26 is connected via a filter capacitor 56 to the load 28 to filter the output voltage V40 and to reduce a ripple of the load current $I_1$.

The connection circuit 10 is connected to the driver stage 26 for driving the load 28. The load 28 is preferably a lighting unit 28 comprising more preferred one or more LEDs so that the connection circuit 10, the driver stage 26 and the lighting unit 28 form a light apparatus 60. The light apparatus 60 can replace a fluorescent lamp as a retrofit lamp, wherein the input terminals 12, 14, 18, 20 can be flexibly connected to either mains 16 or a high frequency ballast so that a rewiring of the fluorescent lamp can be omitted.

Figure 2A:
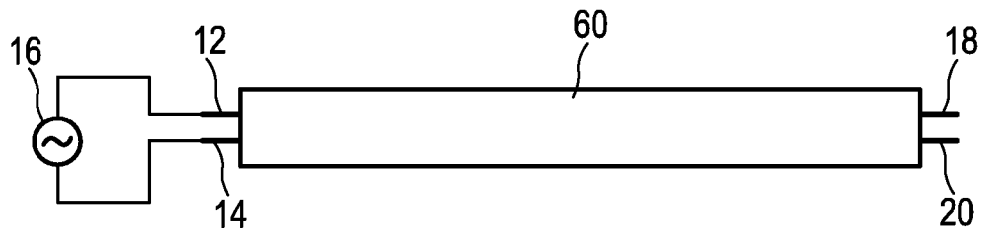
FIGS. 2a-c show schematic wiring diagrams illustrating the connection of a lighting apparatus to different electrical power supplies.
Figure 2B:
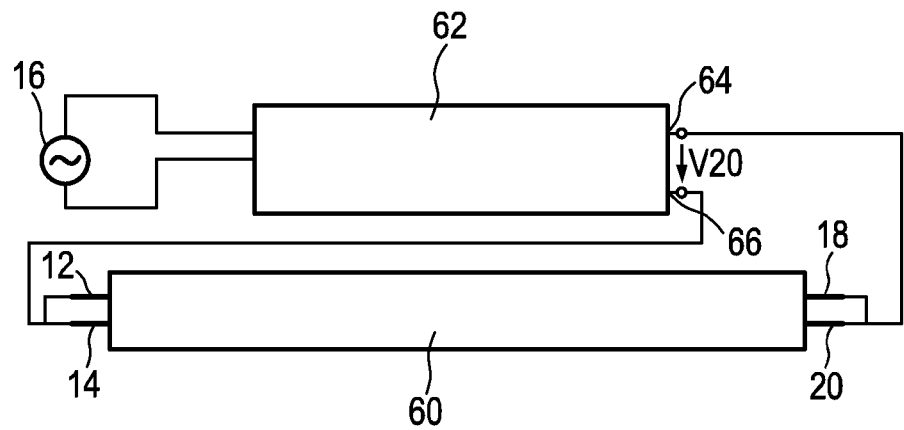
Figure 2C:
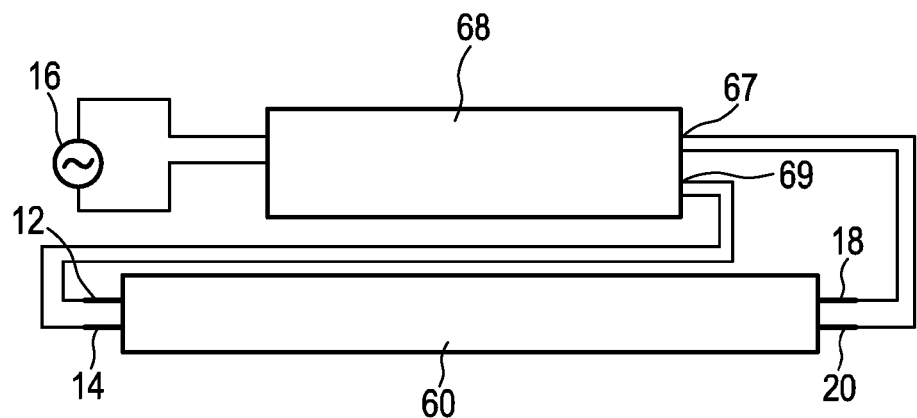

FIGS. 2a-c show schematically different connections of the light apparatus 60 to different electrical power supplies.

FIG. 2a shows a wiring diagram wherein the light apparatus 60 is connected directly to mains 16. The electrical power is applied only to the first input terminals 12, 14 of the connection circuit 10, wherein no electrical power is supplied to the second input terminals 18, 20. In this case, the filter capacitor 50 has a high impedance for the mains voltage V10 so that no voltage is supplied to the second input terminals 18, 20 which may cause an electrical shock.

FIG. 2b shows a wiring diagram of the light apparatus 60 connected to an instant start high frequency ballast 62. The instant start ballast 62 is connected to mains 16. The instant start ballast 62 comprises two output terminals 64, 66 which are connected to the first input terminals 12, 14, which are shortened, via the lamp socket, and to the second input terminals 18, 20 which are also shortened, via the lamp socket. Hence, the high frequency voltage V20 is provided directly to the first input terminals 12, 14 and the second input terminals 18, 20 and rectified by the rectifier unit 22 for providing the rectified voltage V30 to the driver stage 26.

FIG. 2c shows a wiring diagram wherein the light apparatus 60 is connected to a programmed start high frequency ballast 68. The programmed start high frequency ballast 68 comprises two pairs of output terminals 67, 69 which are connected separately to the first input terminals 12, 14 and the second input terminals 18, 20 of the light apparatus 60, respectively. The programmed start high frequency ballast 68 provides a heating current to preheat the light apparatus 60 before ignition of the high voltage whereby the lifetime of the light apparatus 60 is increased. Since the first input terminals 12, 14 are connected for high frequency voltages by means of the low impedance of the input capacitor 54 and since the second input terminals 18, 20 are connected to each other, the two different voltages for preheat and for driving the load 28 are each provided via the rectifier unit 22 to the drive stage 26.

Hence, the connection circuit 10 provides a flexible possibility to connect the light apparatus 60 either to mains 16 or to different ballast circuitries 62, 68, wherein the connection circuitry 10 prevents damages or electrical shocks by means of the filter capacitor 50.

Figure 3:
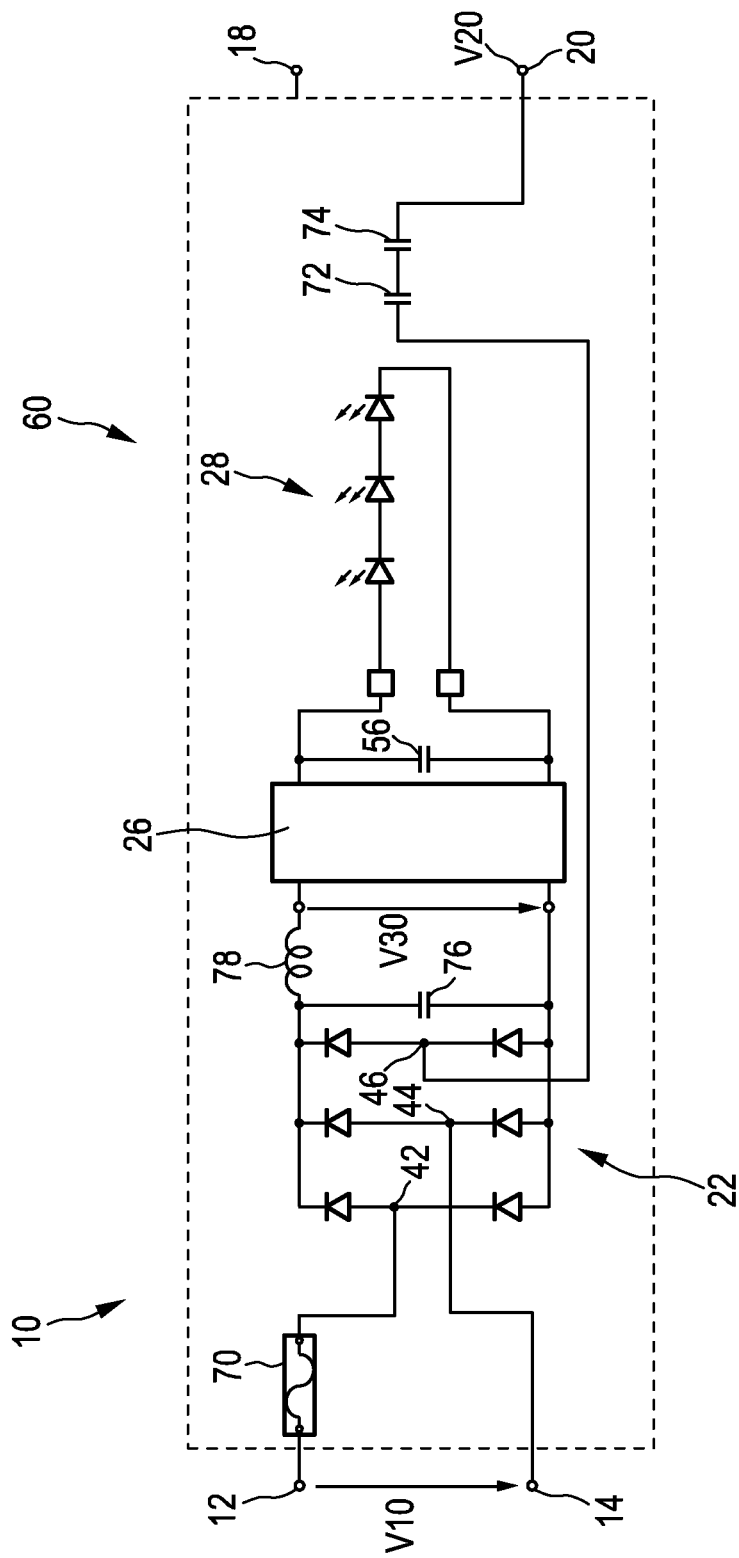
FIG. 3 shows an embodiment of the connection circuitry shown in FIG. 1 including a dummy input terminal.

FIG. 3 shows an embodiment of the connection circuit 10 and the light apparatus 60 shown in FIG. 1. Identical elements are denoted by identical reference numerals, wherein here merely the differences are explained in detail.

The load 28 is in this case formed as an LED tube 28 comprising three LEDs. The first input terminal 12 is connected via a fuse 70 to the node 42 of the rectifier unit 22 in order to protect the connection circuit against high currents and wrong connections. The second input terminal 18 is a dummy connector, which is electrically disconnected from the components of the connection circuit 10. The second input terminal 20 is connected via two filter capacitors 72, 74 to the node 46 of the rectifier unit 22 in order to protect the second input terminal 20 from mains voltage V10 as mentioned above. The two filter capacitors 72, 74 are connected in series to each other in order to provide an improved safety if one of the two filter capacitors 72, 74 fails.

The electromagnetic interference filter device 24 comprises a capacitor 76 and an inductance 78 for reducing emission of electromagnetic interference from the driver.

Hence, the light apparatus 60 shown in FIG. 3 is protected against wrong connection by means of the fuse 70 and the disconnected second input terminal 80.

Figure 4:
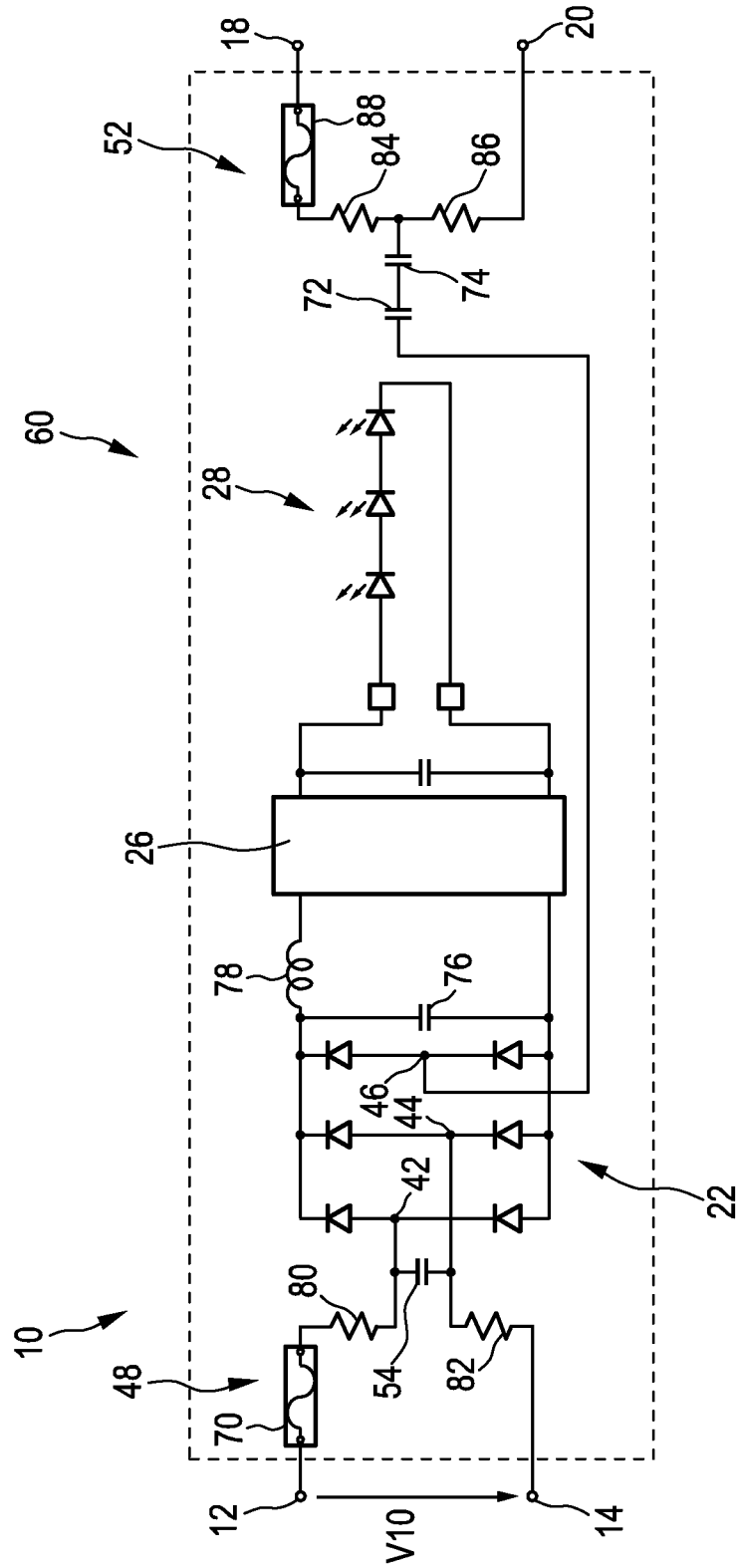
FIG. 4 shows a further embodiment of the connection circuitry shown in FIG. 1.

FIG. 4 shows a further embodiment of the connection circuitry 10 and the light apparatus 60 shown in FIG. 1. Identical elements are denoted by identical reference numerals, wherein here merely the differences are explained in detail.

The first input terminals 12, 14 are connected via the input circuitry 48 to the rectifier unit 22. The input circuitry 48 comprises the fuse 70 and two resistors 80, 82. The input capacitor 54 may be a part of the input circuitry 48. The resistors 80, 82 of the input circuitry 48 have a resistance value similar to the filament resistance of the fluorescent lamp, which shall be replaced by the light apparatus 60. By means of the input circuitry 48, the external power supply works properly since the input resistance of the connected light apparatus 60 is similar to the load for which the external power supply is designed.

The second input terminals 18, 20 are connected via the input circuitry 52 and via the filter capacitors 72, 74 to the node 46. The input circuitry 52 comprises two resistors 84, 86 and a fuse 88 for connecting the second input terminals 18, 20 to each other and to the filter capacitors 72, 74. The fuse 88 connects the second input terminal 18 via the resistor 84 to the filter capacitors 72, 74, while the resistor 86 connects the second input terminal 20 to the filter capacitor 72, 74. The resistance values of the resistors 84, 86 are similar to the filament resistance of the fluorescent lamp so that the high frequency ballast circuit 62, 68 work properly due to the similar filament resistance.

By means of the fuse 70 and the fuse 88, the connection circuit 10 shown in FIG. 4 is further protected against wrong connection.

Figure 5:
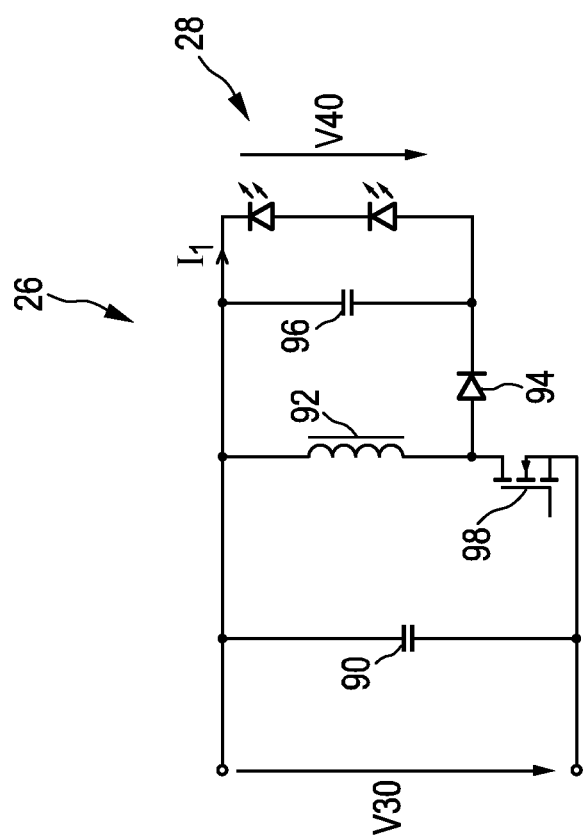
FIG. 5 shows a schematic block diagram of a driver device for driving lighting units.

FIG. 5 shows a preferred embodiment of the driver stage 26 for driving the load 28, in particular the LED tube 28. The driver stage 26 is formed as a switching mode power supply (SMPS) driver, which is preferably a buck boost power converter as shown in FIG. 5. The driver stage 26 comprises an input capacitor 90, an inductance 92, a diode 94, an output capacitor 96 and a controllable switch 98 for providing the output voltage V40 and the output current $I_1$ for driving the load 28 and in particular the LED unit 28 as shown in FIG. 5. The buck boost converter shown in FIG. 5 is compatible to wide input voltage ranges and wide output voltage ranges so that the different input voltages V30 can be set to a desired drive voltage V40 for driving the load 28. The buck boost converter is preferred since the mains voltage V10 is different from the high frequency ballast output voltage V20. In an alternative embodiment the driver stage 26 is formed as a boost converter, a buck converter or a flyback power converter.

When the connection circuit 10 is connected directly to mains 16, the rectified voltage V30 is converted to a DC current as the output current $I_1$ by means of the driver stage 26. If the connection circuit 10 is connected to one of the high frequency ballast circuits 62, 68, the high frequency current is rectified by the rectifier unit 22 and then converted to the DC output current $I_1$. Since the high frequency ballasts behave as a current source and the mains behaves as a voltage source, the two connection modes are different. The control loop of the switching mode power supply drive 26 adapts its control scheme to the connected mains 16 or the connected high frequency ballast 62, 68, in order to maintain a constant LED current.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A connection circuit for connecting a driver device to an external power supply for driving an LED unit comprising one or more LEDs, the connection circuit comprising:
a pair of first input terminals for connecting the connection circuit to an external power supply and for receiving an input voltage from the external power supply,
at least one second input terminal suitable for connecting the connection circuit to the external power supply and for receiving an input voltage from the external power supply,
a rectifier unit connected to the pair of first input terminals and to the at least one second input terminal for rectifying the input voltage received from the first input terminals and/or the at least one second input terminal and for providing a rectified voltage to the driver device for driving the LED unit,
wherein the at least one second input terminal is connected to the rectifier unit only by means of a conductive path including a frequency filter; and
wherein the rectifier unit comprises three parallel rectifier paths, wherein the first input terminals are each connected to a first and a second of the rectifier paths and the at least one second input terminal is connected to a third of the rectifier paths.

2. The connection circuit as claimed in claim 1, wherein each of the rectifier paths comprises two diodes, wherein the input terminals are each connected to one node between the two diodes.

3. The connection circuit as claimed in claim 1, wherein the frequency filter is a high pass filter for filtering low frequency input voltage.

4. The connection circuit as claimed in claim 1, wherein the first input terminals are connected to each other via a high pass filter.

5. The connection circuit as claimed in claim 1, wherein the pair of first input terminals is connected via an input circuitry to the rectifier unit, wherein the input circuitry comprises a plurality of resistors.

6. The connection circuit as claimed in claim 1, wherein the driver device comprises a DC to DC converter for providing a drive current for driving the LED unit.

7. The connection circuit as claimed in claim 1, wherein the frequency filter comprises two capacitors connected in series between the at least one second input terminal and the rectifier unit.

8. The connection circuit as claimed in claim 1, wherein the pair of first input terminals are adapted to be connected to mains voltage supply.

9. The connection circuit as claimed in claim 1, wherein the pair of first input terminals and the at least one second input terminal are adapted to be connected to a high frequency ballast circuitry.

10. A apparatus comprising a plurality of lighting elements in particular a plurality of LEDs, a driver device for driving the lighting elements and a connection circuit as claimed in claim 1 for connecting the driver device to an external power supply.

11. The connection circuit as claimed in claim 1, wherein the frequency filter is connected to a pair of second input terminals for receiving the input voltage.

12. The connection circuit as claimed in claim 11, wherein the pair of second input terminals is connected via an input circuitry to the frequency filter, wherein the input circuitry comprises a plurality of resistors.

13. The connection circuit as claimed in claim 1, wherein the rectifier unit connected via an electromagnetic interference filter device to the driver device.

14. The connection circuit as claimed in claim 13, wherein the electromagnetic interference filter device comprises an inductor and a capacitor.

* * * * *